Figure 1:
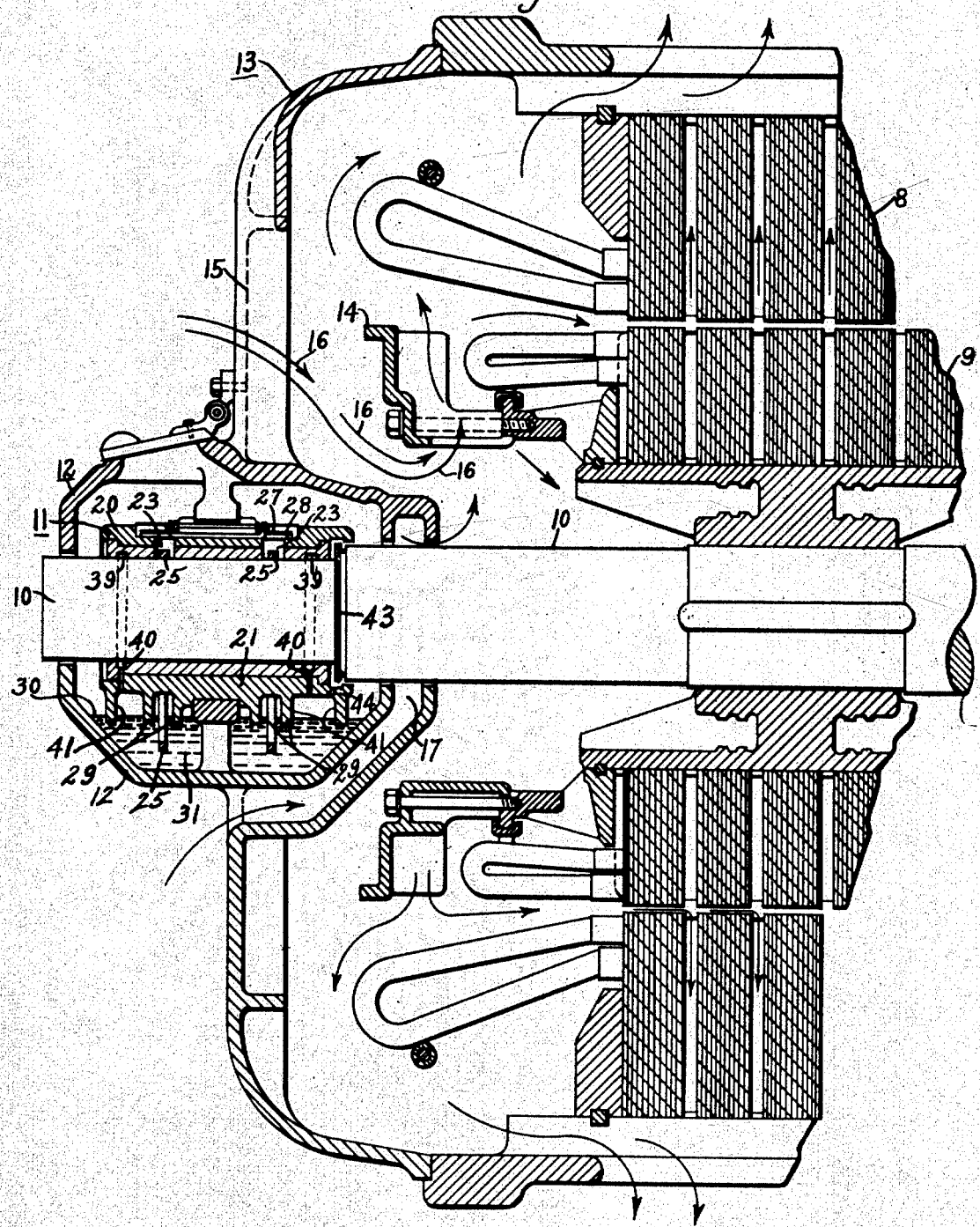

Aug. 9, 1932.　　　J. L. BROWN　　　1,870,791
SEALED SLEEVE BEARING
Filed April 16, 1928　　　3 Sheets-Sheet 1

INVENTOR
John L. Brown
BY
Wesley G. Carr
ATTORNEY

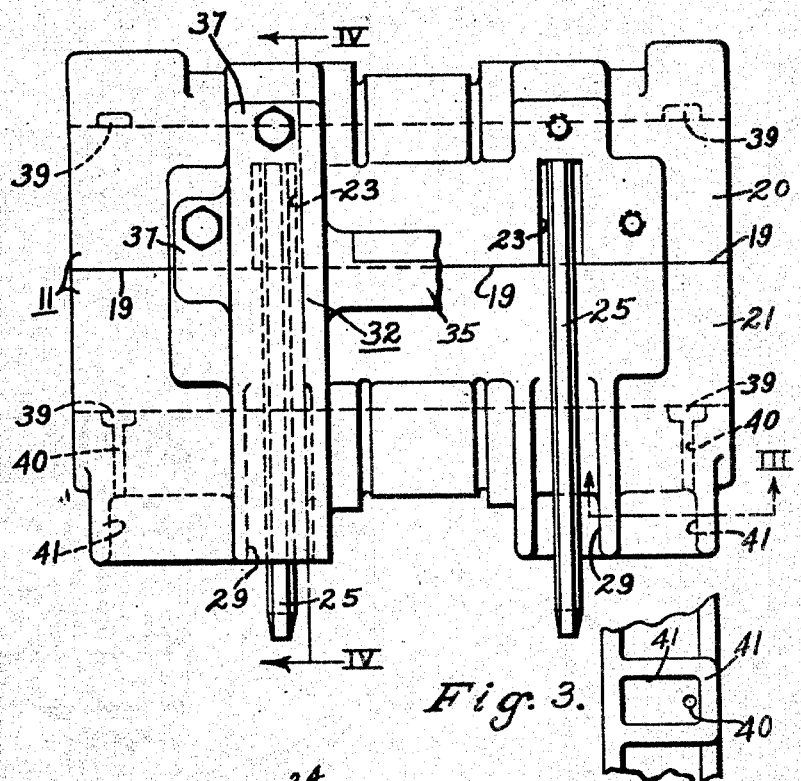
Fig. 2.
Fig. 3.
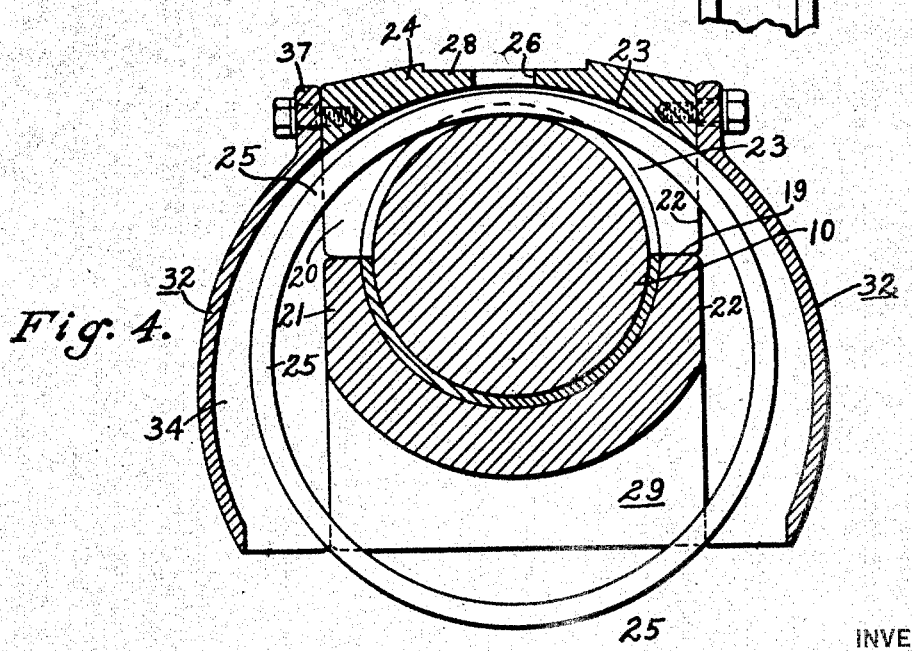
Fig. 4.

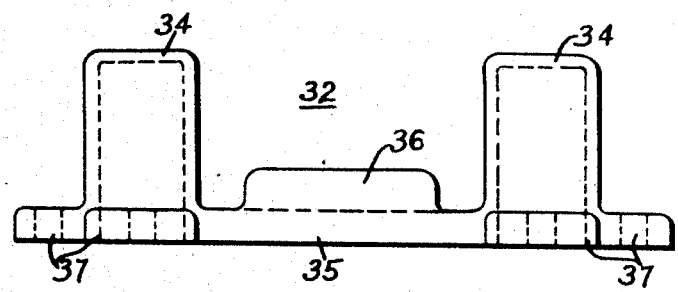
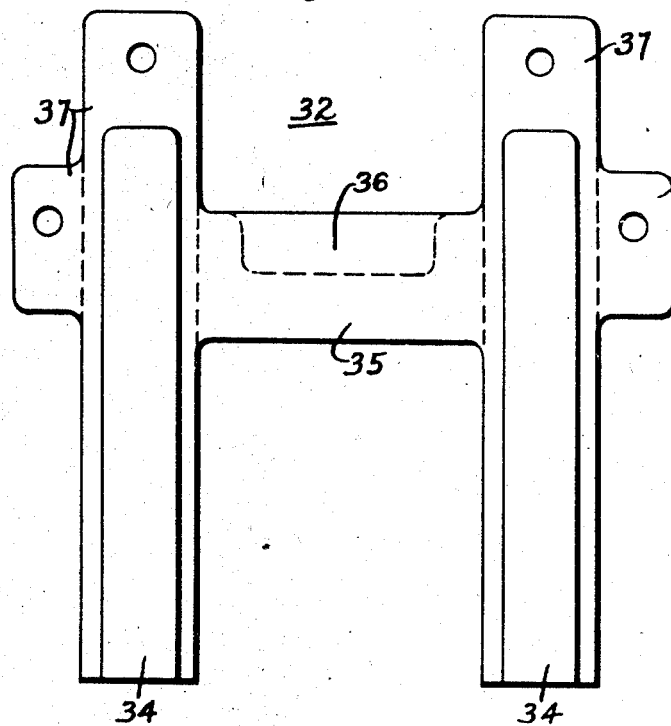
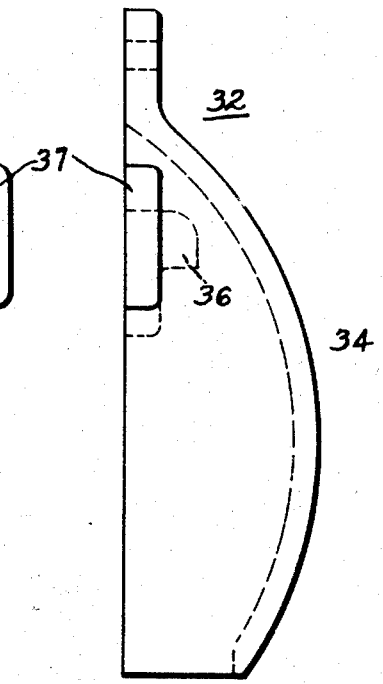

Patented Aug. 9, 1932

1,870,791

UNITED STATES PATENT OFFICE

JOHN L. BROWN, OF VERONA, PENNSYLVANIA, ASSIGNOR TO WESTINGHOUSE ELECTRIC & MANUFACTURING COMPANY, A CORPORATION OF PENNSYLVANIA

SEALED SLEEVE BEARING

Application filed April 16, 1928. Serial No. 270,183.

My invention relates to sealed sleeve bearings, and more particularly to bearings located near the rotor fan of ventilated dynamo-electric machines wherein suction created by the rotor fan causes oil-saturated air to be drawn from the bearing housing into the machine.

In split bearing pedestals or brackets, the oil spray condenses in parts of the interior walls of the upper part of the housing and trickles down to the split. Unless the split is thoroughly sealed, the small capillary spaces between the upper and lower halves of the housing become filled with oil. The suction produced by the blower at the inner end of the housing draws off oil from the ends of these crevices, and the loss, at this point, is replenished by conduction of oil along the capillary spaces, which are, in turn, continuously fed by drainage down the inside walls of the upper part of the housing.

Even though the split is sealed, the escape of the oil in the form of a spray mixed with air currents takes place through the annular clearances around the shaft where it emerges from the inner end of the housing.

Although the rate of escape of the oil from the source just mentioned may be very small, the aggregate loss into the windings in a number of months is very appreciable, and causes serious deterioration of the insulation. If, however, the creation of oil spray in the housing can be prevented, the oil leakage will be eliminated.

Statistics have shown that more than 40% of motor repairs are made necessary by the breakdown of windings that have become soaked with oil. With sleeve bearings of the old non-sealed type, it has been found almost impossible to keep oil from getting into the winding.

The principal object of my invention is to confine the splash made by the oil rings, as they are rotated by the shaft, to a small oil-ring chamber which is entirely closed except at the lower part which is submerged below the oil level and permits the oil ring to dip in the oil. It is thus possible to keep the air space, in the housing surrounding the bearing-assembly, free from spray and vapor ordinarily created by rapidly revolving oil rings.

Another object of my invention is to provide a chamber for receiving the oil upon leaving the bearings, which is sealed from the atmosphere, and the bottom part of which is submerged in the oil.

My invention resides in a means for enclosing the oil rings in a sleeve bearing, in the manner hereinafter described and claimed, and illustrated in the accompanying drawings, wherein Figure 1 is a sectional view of a dynamo-electric machine embodying my invention, Fig. 2 is a longitudinal elevational view of a split bearing removed from its housing, the right-hand portion of my splash guard being broken away to show the oil-ring groove, Fig. 3 is a bottom plan view showing, in detail, the construction of a chamber for confining the splashing resulting from the return of the oil from the end of the bearing to the oil-reservoir in the bottom of the housing, Fig. 4 is a transverse section on the line IV—IV of Fig. 2, and Figs. 5, 6 and 7 are plan, side, and end elevational views, respectively, showing the structural details of my splash guard.

My invention is illustrated as applied to a dynamo-electric machine having a stator member 8, and having a rotor member 9 which is fixed to a shaft 10 that passes through a bearing 11 of my improved design. The latter is carried by a bearing housing 12 which may be mounted either on a pedestal or on an end frame 13 which constitutes a part of the machine casing. At a point adjacent to the bearing, the rotor 9 is provided with a blower 14 that draws the air through perforations which are provided between spokes 15 in the end frame 13, as indicated by the arrows 16, the air then passing over the windings and cores and leaving the machine through the middle portion of the stator frame.

A suction is also created near the shaft, as a result of the fan action, which tends to draw air into the machine from within the bearing housing 12, such air containing oil vapors that are undesirable.

Although methods have been utilized to prevent such air from being drawn into the machine from around the shaft, at the inner end of the bearing housing, the quantity of oil drawn into the machine has merely been reduced and has not been entirely eliminated. Furthermore there has been no serious attempt to eliminate the oil spray.

One method for curtailing the escape of oil-laden air from the inner end of the bearing housing, as shown in the Hellmund and Moore Patent No. 1,329,241, granted on January 27, 1920 and assigned to the Westinghouse Electric & Manufacturing Company, comprises the provision of a by-pass chamber 17 surrounding the shaft and fitting over the inner part or end of the bearing housing, said chamber being connected with the outside atmosphere. The chamber 17 reduces the suction at the inner end of the bearing and tends to equalize the pressure there with the pressure at the front end of the bearing, thereby reducing the tendency for air to flow through the housing.

The bearing shell 11 is preferably split, as indicated at 19 in Figs. 2 and 4, into two parts, a top part 20 and a bottom part 21.

The top and bottom halves of the bearing shell are provided with flat, vertical side walls, as indicated at 22 in Fig. 4, and the top half 20 is provided with one or more oil-ring slots 23 which are not cut through to the top of this bearing portion, so that a thin top wall 24 of metal is left over the top of the oil-ring slot, the oil ring 25 being removed by lifting off the entire top half of the bearing. A small sight-hole is provided, however, through the top shell 24, to permit inspection of the oil ring, as indicated at 26 in Figs. 1 and 4, and this sight-hole is normally closed by a spring-pressed, felt-lined cover 27, shown in Fig. 1, the top surface of the bracket being flattened to accommodate said cover, as indicated at 28 in Figs. 1 and 4.

The bottom half of my bearing shell is provided with depending skirts on either side of the slip ring 25, as indicated at 29, said skirts depending to a point below the oil level 30 of the oil reservoir 31 in the bottom of the bearing housing 12.

The ends or edges of the oil-ring slots 23 and of the depending skirts are closed by my splash guards 32, which are shown in position in Fig. 4 and in the left half of Fig. 2, and in detail in Figs. 5 to 7. The splash guards fit tightly against the vertical side walls 22 of the bearing shell and provide enclosed spaces which confine the oily mist which is thrown off from the rapidly revolving oil rings 25, thereby preventing the admixture of such oil particles with the air which passes through the bearing.

The splash guard 32 has channel portions 34 that are spaced by a cross portion 35 having an outwardly extending nose portion 36 and boss portions 37. The nose portion 36 of the splash guard cooperates with the side of the housing and thereby provides means to prevent the bearing from rotating.

The ends of the bearing are provided with oil-collecting grooves 39 for collecting the oil that would otherwise be expelled from the ends of the bearing. This oil is drained through passageways 40 into the oil well 41. In order to confine the splash of the oil, as it drips from the ends of the passageway 40, I provide depending skirts composing a receiving chamber 41 in the bottom of the bearing, the bottom of the chamber being below the oil level and, therefore, sealed by the oil.

The shaft 10 may be provided with oil-throwing grooves 43 at the inner end of the bearing, in order to stop such oil as passes the oil-catching grooves 39, said oil being returned to the oil reservoir 31 by means of a passageway 44 in the lower half 21 of the bearing, said passageway opening into the same sealed chamber 41 as the passageway 40.

It will be noted that the chamber which encloses the slip-ring space is not quite hermetically sealed from the rest of the space within the bearing bracket. This is a desirable feature, as the restricted air paths provided by the air-leaking joints under the top cover 27, and also between the end guards 32 and the vertical sides 22 of the bearing, permit the equalization of the air pressure in the slip-ring chamber and in the end portions of the space enclosed by the bearing housing, thus ensuring the same average oil-levels in the slip-ring space as in the rest of the oil reservoir 31.

While I have shown my invention in only one form, it will be understood that various modifications may be made without departing from the spirit and scope thereof as defined in the appended claims.

I claim as my invention:

1. A split bearing sleeve having top and bottom halves having coplanar vertical side surfaces, said top half having a transverse slot across its under side adapted to receive an oil ring, said bottom half having depending skirts on either side of said oil ring, and two removable oil-ring guards secured, one at each side, to said top half to cover the ends of the transverse oil-ring slot, said guards contacting with the ends of said depending skirts to provide a splash-confining chamber for said oil ring, said chamber extending down below the main body portion of the button half of said sleeve.

2. A split bearing sleeve having top and bottom halves having coplanar vertical side surfaces, said top half having a transverse slot across its under side adapted to receive an oil ring, a peep hole in the top of said top half for inspecting said oil ring, an oil-tight closure for said peep hole, said bottom half having depending skirts on either side of said oil ring, and two removable oil-ring guards secured, one at each side, to said top half to cover the ends of the transverse oil-ring slot, said guards contacting with the ends of said depending skirts to provide a splash-confining chamber for said oil ring, said chamber extending down below the main body portion of the bottom half of said sleeve.

3. An oil-ring journal bearing comprising a housing and a sleeve, said housing having an oil reservoir in its bottom, said sleeve having means, including perforations through its under side near its ends, for collecting oil from the journal bearing surfaces and returning it to the reservoir, characterized by the fact that said perforations, at each end of said sleeve, are surrounded by downwardly depending side and end skirts providing chambers entirely surrounding the dripping oil which leaves said perforations, said skirts depending below the oil level in said reservoir.

4. In combination, a split bearing housing having top and bottom halves, a split bearing sleeve supported in said housing and comprising top and bottom halves, an oil-ring-lubricated shaft journaled in said sleeve, an oil reservoir in the bottom half of said housing, the top half of the sleeve having an oil-ring-receiving slot cut across its inner bearing surface but not cut through the top, an oil ring riding on the shaft within said oil-ring-receiving slot for raising oil from the reservoir to the journal bearing surfaces during normal continuous operation, the bottom half of the sleeve having downwardly depending skirts on either side of said oil ring and dipping into the oil in said reservoir, and splash guards depending from each side of the top half of the sleeve at the ends of said oil-ring-receiving slot for enclosing said oil ring, said guards dipping into the oil in said reservoir and contacting with the ends of said depending skirts, characterized by the fact that the bottom half of the sleeve has means, including perforations through its under side near its ends, for collecting oil from the journal bearing surfaces and returning it to the reservoir, and further characterized by the fact that said perforations, at each end of the sleeve, are surrounded by downwardly depending side and end skirts providing chambers entirely surrounding the dripping oil which leaves said perforations, said last mentioned skirts depending below the oil level in said reservoir.

In testimony whereof, I have hereunto subscribed my name this 10th day of April 1928.

JOHN L. BROWN.